(12) United States Patent
Le Rouzic

(10) Patent No.: US 7,044,051 B2
(45) Date of Patent: May 16, 2006

(54) APPARATUS FOR EXTRACTION OF JUICE AND PULP FROM PLANT PRODUCTS

(75) Inventor: Claude Le Rouzic, Montceau les Mines (FR)

(73) Assignee: Hameur S.A., Luxembourg (LU)

( * ) Notice: Subject to any disclaimer, the term of this patent is extended or adjusted under 35 U.S.C. 154(b) by 143 days.

(21) Appl. No.: 10/935,714

(22) Filed: Sep. 8, 2004

(65) Prior Publication Data

US 2005/0056161 A1    Mar. 17, 2005

(30) Foreign Application Priority Data

Sep. 17, 2003  (FR)  .................... 03 10920
Feb. 27, 2004  (FR)  .................... 04 02029

(51) Int. Cl.
*A23N 1/00* (2006.01)
*A23N 1/02* (2006.01)
*A47J 19/02* (2006.01)

(52) U.S. Cl. .............................. 99/512; 99/511; 99/513

(58) Field of Classification Search ................. 99/495, 99/510–513, 484, 536, 537; 210/360.1, 380.1; 241/369, 37.5, 92, 282.1, 282.2, 101.1; 366/314, 366/601

See application file for complete search history.

(56) References Cited

U.S. PATENT DOCUMENTS

| | | | | |
|---|---|---|---|---|
| 2,297,880 A | * | 10/1942 | Fredrickson | 99/512 |
| 2,311,379 A | * | 2/1943 | Gillanders | 99/512 |
| 2,845,971 A | * | 8/1958 | Sosa | 99/512 |
| 3,101,107 A | | 8/1963 | Posener et al. | |
| 3,892,365 A | * | 7/1975 | Verdun | 241/92 |
| 4,345,517 A | * | 8/1982 | Arao et al. | 99/511 |
| 4,506,601 A | * | 3/1985 | Ramirez et al. | 99/511 |
| 4,614,153 A | * | 9/1986 | Kurome et al. | 99/511 |
| 4,681,031 A | * | 7/1987 | Austad | 99/511 |
| 4,700,621 A | * | 10/1987 | Elger | 99/511 |
| 4,840,119 A | * | 6/1989 | Caldi | 99/512 |
| 5,222,430 A | | 6/1993 | Wang | |
| 5,289,763 A | | 3/1994 | Le Rouzic et al. | |
| 5,421,248 A | | 6/1995 | Hsu | |

\* cited by examiner

*Primary Examiner*—Timothy F. Simone
(74) *Attorney, Agent, or Firm*—Leydig, Voit & Mayer, Ltd.

(57) ABSTRACT

A press for extracting juice and pulp from plant products, which has a motor component, a tank, and a cylindrical strainer, symmetrical about an axis, arranged in the tank and having a perforated radial wall, an opening for introduction of the plant products into strainer, and dilaceration teeth, the strainer being rotated around the axis by the motor component. The press has a blade extending inside the strainer near the perforated radial wall of the strainer, and the strainer being is rotated relative to the blade.

12 Claims, 4 Drawing Sheets

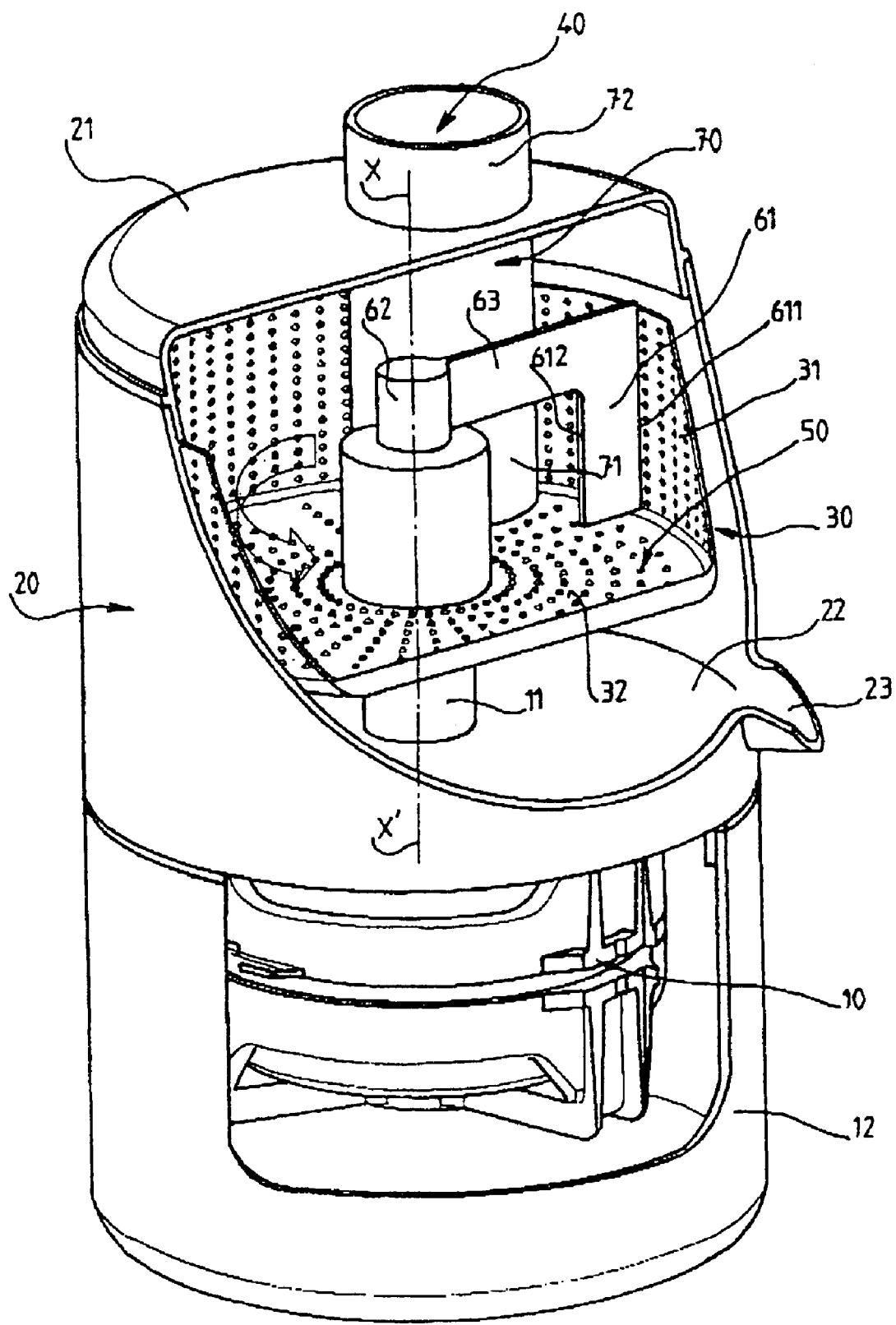

Figure 5:
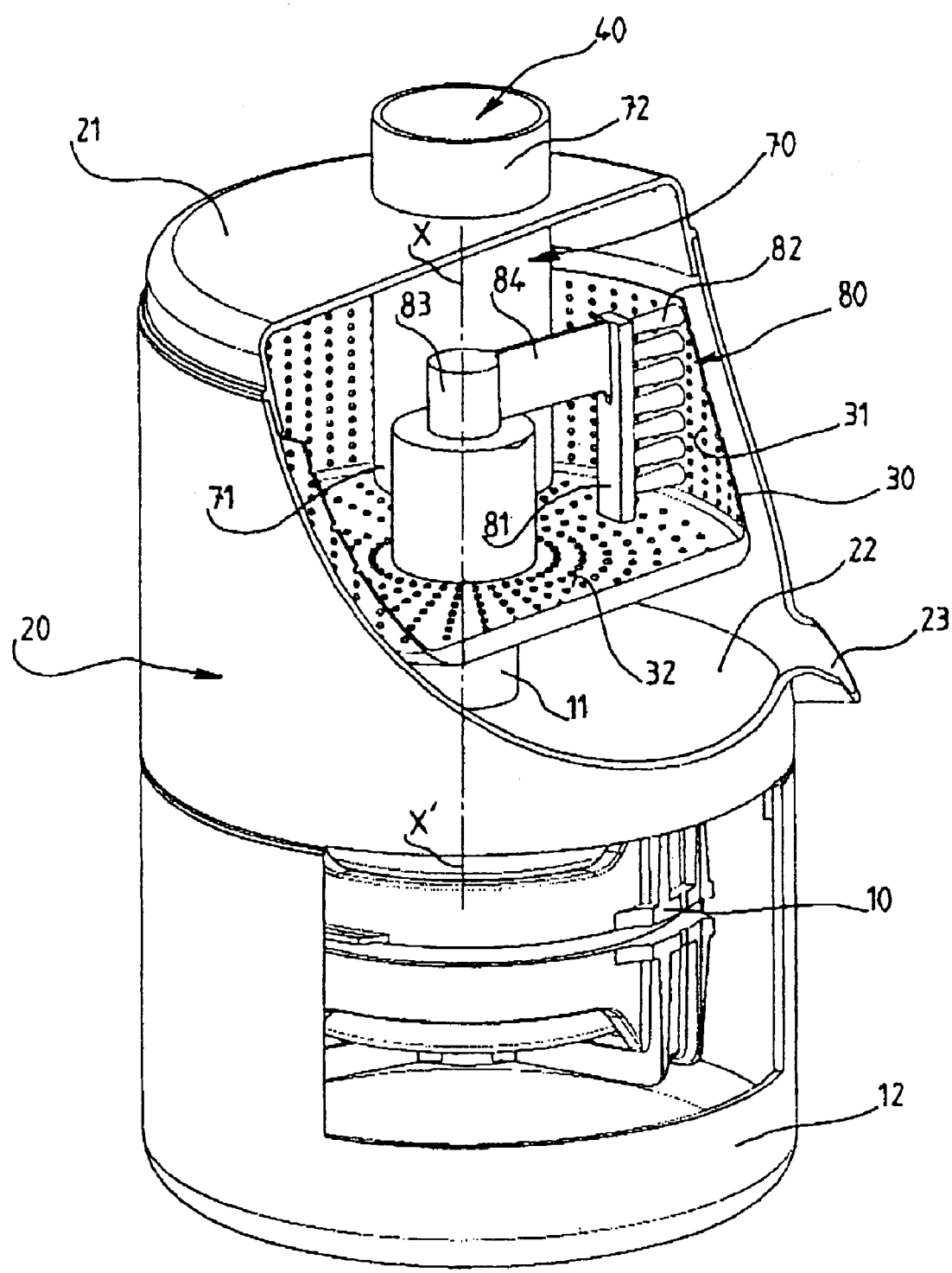

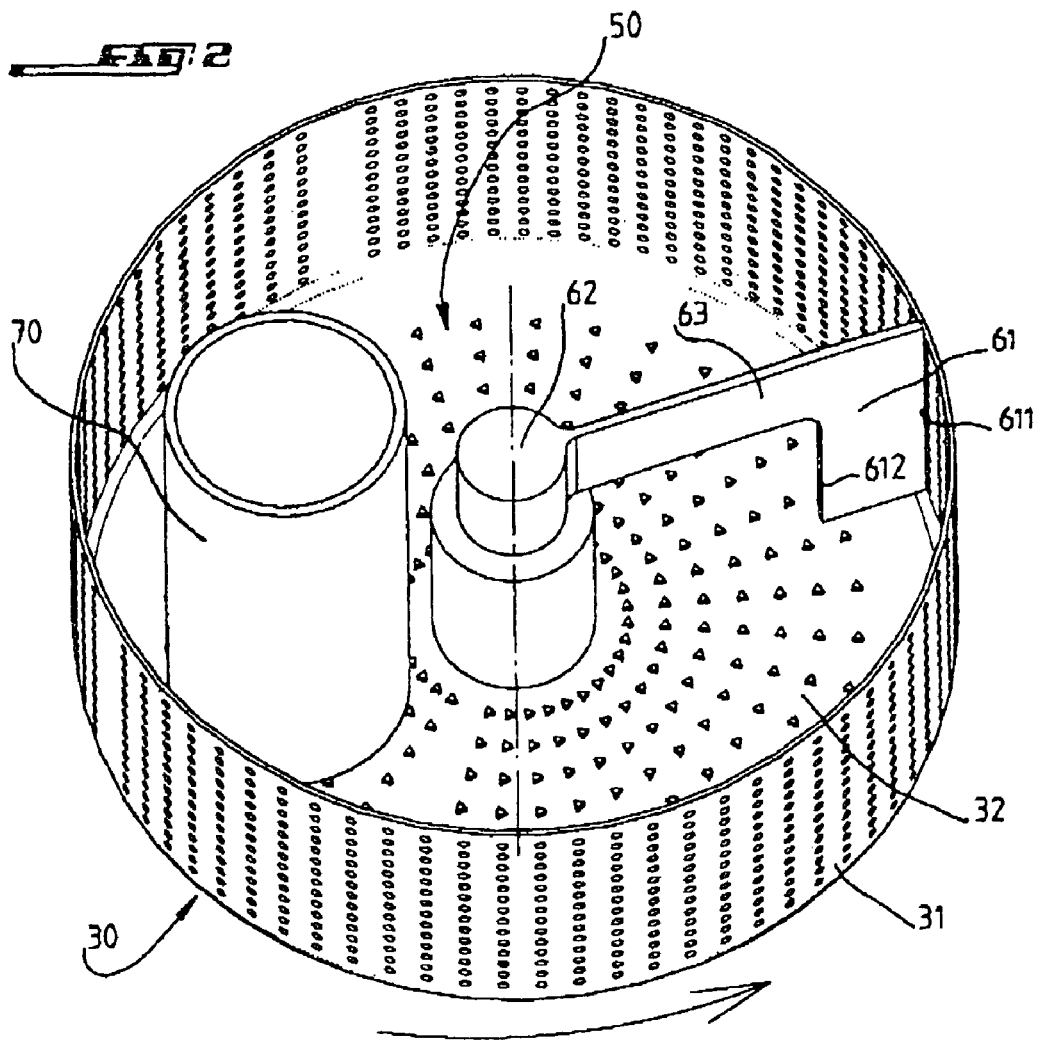
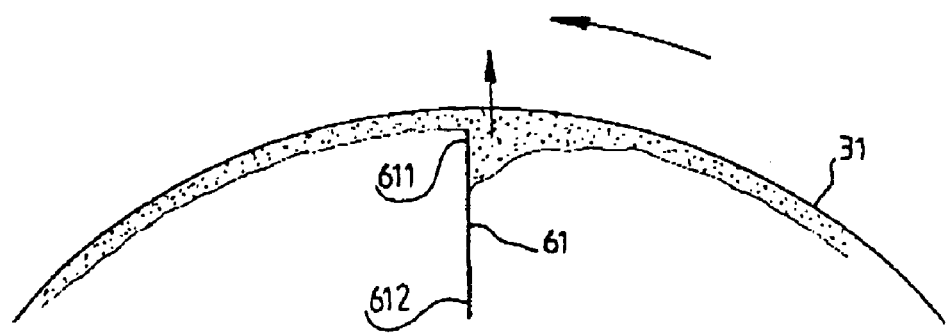

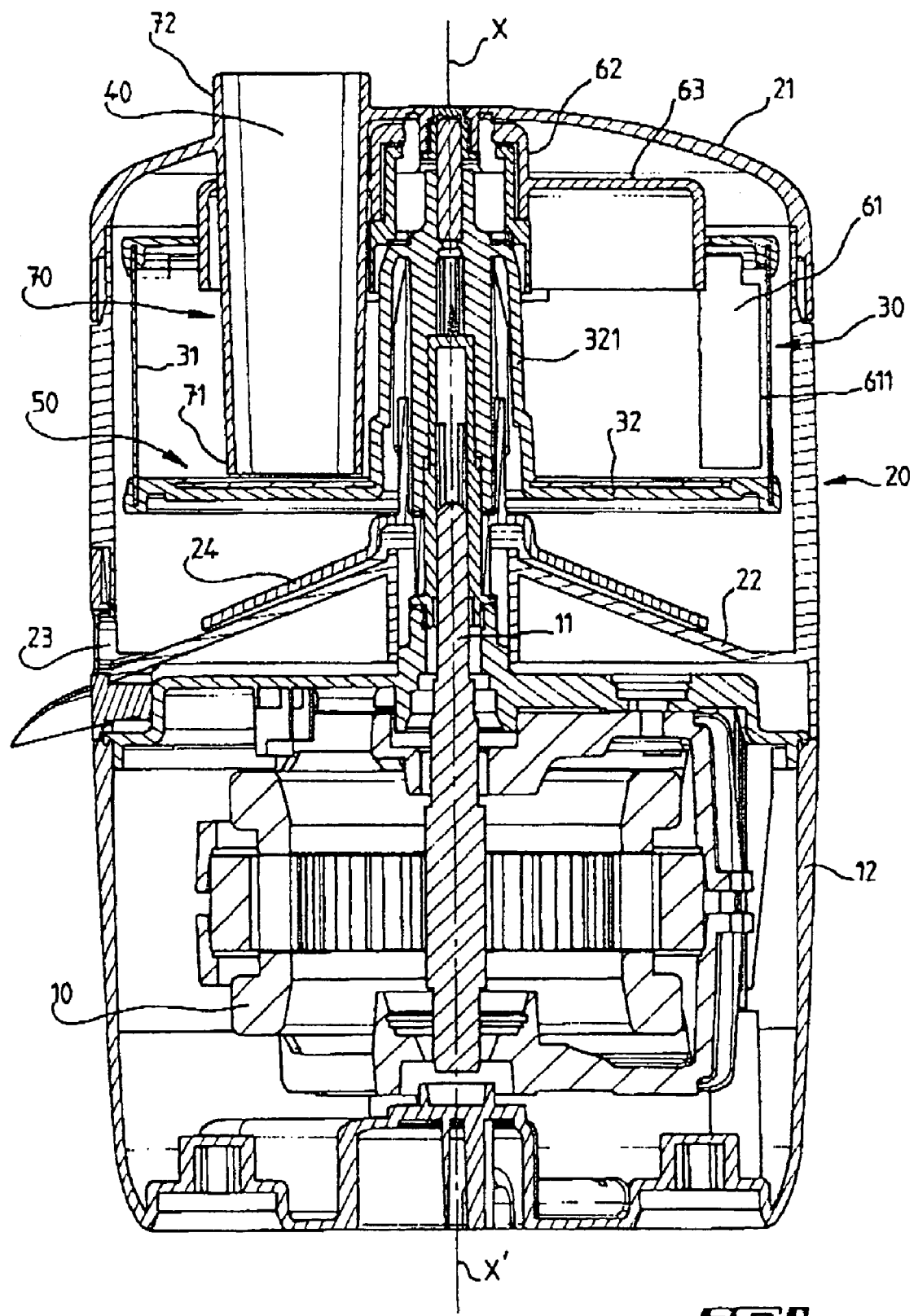

APPARATUS FOR EXTRACTION OF JUICE AND PULP FROM PLANT PRODUCTS

FIELD OF THE INVENTION

The invention generally relates to an apparatus for extraction of juice and pulp from plant products.

More precisely, the invention relates to an apparatus for extraction of juice and pulp from plant products which has a motor component, a tank, a cylindrical strainer with an axis of symmetry X-X' arranged in the tank and having a perforated radial wall, an opening for introduction of the plant products into the strainer, some means for dilaceration of the products introduced into the strainer, the strainer being rotated around axis X-X' by the motor component, such that the dilacerated products are flattened against the radial wall.

BACKGROUND

Apparatuses of this type are known in the prior art, and in particular from the patent document WO 89/06106 which discloses a centrifuge with a vertical axis functioning by accumulation, that is to say without discharge of the fruit residues.

These apparatuses function well with hard products such as carrots and apples. They are much less effective with fruits with soft flesh such as, for example, strawberries or tomatoes. For these fruits, the yield, that is to say the weight of extracted juice with respect to the starting weight of the fruits, is very low or even zero.

Certain fruits, such as black currants, cannot be processed in the prior art apparatuses at all, and must be crushed manually. But that method is very time consuming, and only small quantities of juice can be prepared in that way.

SUMMARY OF THE INVENTION

In this context, the present invention aims to remedy the failings mentioned above.

For this purpose, the apparatus of the invention has a blade extending to the interior of a strainer, near a perforated radial wall of the strainer, the strainer being given a rotational movement relative to the blade so that it exerts a force on the dilacerated products flattened against the radial wall during extraction of the juice and pulp.

In a preferred embodiment of the invention, the blade is immobile.

For example, the blade extends over the whole axial height of the perforated wall of the strainer.

Advantageously, the blade is radial.

Preferably, the tank has a bottom, a lateral discharge opening for the juice or pulp, and a discharge cone rotated by the motor component, this cone being arranged between the bottom and the strainer, so that the juice or pulp coming out of the strainer and falling on the cone is moved towards the discharge opening.

For example, the motor component has a drive shaft for the strainer parallel to axis X-X', the blade being connected with a hub mounted on the shaft, the shaft being free to rotate with respect to the hub.

Advantageously, the tank has an introduction spout extending the opening to the interior of the strainer, the blade stopping against the spout when the strainer is rotated by the motor component.

According to another aspect, the products leave residues on the radial wall during the juice and pulp extraction operation, and the apparatus can include a brush, for cleaning the residues after the extraction operation, which is arranged inside the strainer in contact with the radial wall, the strainer being given a rotational movement relative to the brush.

Preferably, the brush can be attached in a removable manner on the blade, or be mounted in the strainer instead of on the blade.

Advantageously, the brush can have a support extending parallel to axis X-X', at a distance from the radial wall, and bristles attached to the support and extending radially until making contact with the radial wall.

BRIEF DESCRIPTION OF DRAWING FIGURES

Other characteristics and advantages of the invention will emerge clearly from the description given below, on an indicative and non-limiting basis, with reference to the appended figures, among which:

FIG. 1 is an oblique view of the apparatus according to the invention, cut-away parts allowing one to see the inside of the tank and the motor, FIG. 2 is a partial oblique view of the strainer, the spout and the blade of FIG. 1, FIG. 3 is a simplified diagram illustrating the operation of the apparatus of FIG. 1, FIG. 4 is an axial section of the apparatus of FIG. 1, and FIG. 5 is an oblique view of the apparatus similar to that of FIG. 1, with the blade replaced by a brush for cleaning the strainer.

DETAILED DESCRIPTION

The extraction apparatus represented in FIG. 1 is suitable for the extraction of juice and pulp from plant products, essentially fruits and vegetables.

It includes motor component 10 arranged in base 12, roughly cylindrical tank 20 mounted on base 12, cylindrical strainer 30 with axis of symmetry X-X' arranged in tank 20 and having perforated radial wall 31, opening 40 for the introduction of plant products into strainer 30, and some means 50 for dilaceration of the products introduced into strainer 30.

Tank 20 and strainer 30 are coaxial.

Motor component 10 has drive shaft 11 passing through bottom 22 of tank 20 and extending in tank 20 along axis X-X'. This shaft 11 rotates strainer 30 at high speed around axis X-X' so as to throw the products against perforated wall 31.

Tank 20 has removable cover 21 on the side opposite from bottom 22, with introduction opening 40 being arranged in this cover 21.

Strainer 30 has an open axial side, on the cover 21 side, in order to allow the introduction of products into the strainer, and solid axial bottom 32 on the side opposite from the open side, that is to say facing bottom 22 of tank 20.

Solid bottom 32 is in the shape of a disk and has central hub 321 which cooperates with drive shaft 11.

To this effect, shaft 11 has a cut-off edge; the central hub has an opening whose shape corresponds to that of the shaft and is slipped onto this shaft.

According to the invention, the apparatus has blade 61, extending to the interior of this strainer 30, near perforated radial wall 31 of the strainer, strainer 30 being given a rotational movement relative to blade 61.

In a preferred embodiment of the invention, blade 61 is immobile. Because strainer 30 is rotated around axis X-X' at high speed, strainer 30 is given a high-speed rotational movement with respect to blade 61.

This blade 61 has a rectangular shape and extends over the whole axial height of perforated wall 31 of strainer 30, from solid bottom 32 to the open axial side of the strainer.

It extends in a radial plane with respect to strainer 30, passing through axis X-X', and has straight radially exterior edge 611 parallel to radial wall 31.

This exterior edge 611 and radial wall 31 of strainer 30 preferably have a spacing between one another of less than three millimeters. The spacing generally used is approximately one millimeter and a half, but very good results can be obtained with smaller or larger spacings, provided that one verifies with case by case tests that the yield obtained is satisfactory for the type of product envisaged.

The products introduced into strainer 30 are dilacerated and pressed against radial wall 31 by centrifugal force. A part of the juice comes out of the products under the action of this force and passes through the holes of radial wall 31. A part of the fruit pulp also passes through the holes.

The residual fraction of the products forms a layer whose thickness increases with the quantity of product introduced.

This layer is rotated with strainer 30.

When the thickness of the product layer exceeds the spacing between blade 61 and radial wall 31, exterior edge 611 exerts a force on the product layer because of the movement of the strainer relative to the blade.

The mechanical stresses thus generated in the layer make it possible to effect crushing of the products in addition to the dilaceration obtained by the dilaceration means. This crushing destructures the pulp and promotes passage of it through perforated wall 31. It enables practically all of the juice to be recovered.

As shown in FIGS. 1 and 2, bottom 32 of strainer 30 is toothed on a side turned towards the interior of strainer 30, and thus constitutes dilaceration means 50. This bottom can be likened to a food processor grater.

Tank 20 has introduction spout 70 which extends introduction opening 40 to the interior of strainer 30 and opens of lower end 71 at the level of toothed bottom 32.

The spacing between lower end 71 and toothed bottom 32 is small, on the order of a few millimeters.

The products are introduced into the apparatus through upper end 72 of the spout, opposite from lower end 71, and they fall on toothed bottom 32. A pushing device, not represented, is then engaged in spout 70 and enables one to press the products against toothed bottom 32.

The spacing between the spout and the bottom is sufficiently small that the products are unable to escape from the spout without being dilacerated by toothed bottom 32.

In a first embodiment variant represented in FIGS. 1 and 2, blade 61 is connected with hub 62 which is mounted on central hub 321 of solid bottom 32 of strainer 30. Shaft 11 and central hub 321 are free to rotate in hub 62. Connecting piece 63, essentially radial, connects an upper part of blade 61 with hub 62, so that a circulation opening is arranged under the connection piece between the blade and the hub in order to let dilacerated products or scraps accumulating on toothed bottom 32 to pass through.

Blade 61 is rotated when motor component is started and stops against spout 70. It is maintained immobile in this position during all the rotation of strainer 30.

In a second embodiment variant, not represented, blade 61 is connected to cover 21.

As shown in FIG. 4, bottom 22 of tank 20 has a conical shape pointing towards strainer 30 and sloping towards a radially exterior edge of the bottom from axis X-X'.

Tank 20 can also have lateral opening 23, for discharge of the juice or pulp, formed in a lateral wall of said tank at the level of bottom 22.

Discharge cone 24, rotated by the motor component around axis X-X', is arranged in tank 20 between bottom 22 and strainer 30. It has the same shape as bottom 22, points towards toothed bottom 32 of cylindrical strainer 30, and has the same slope as bottom 22. It extends parallel to and directly over this bottom.

The juice or pulp coming out of strainer 30 through radial wall 31 and falling on cone 24 is moved towards discharge opening 23 by centrifugal force.

Cone 24 is penetrated by shaft 11, a sealing means, not represented, ensuring sealing between shaft 11 and cone 24.

In an embodiment variant, tank 20 does not have discharge opening 23, the juice and pulp accumulating in the bottom of tank 20.

Tank 20 can be attached to base 12 or can be removable, allowing it to be easily rinsed.

The apparatus can be an apparatus dedicated only to the extraction of juice and pulp.

It can also be formed using a multi-function household food processor normally used for cutting vegetables using various disks. These food processors generally have a removable tank, of the type described above, provided with a cover which is also removable, a motor, and a drive shaft on which the disks can be attached.

It is possible to make this food processor correspond to the invention by fitting cylindrical strainer 20 and blade 61 provided with corresponding hub 62 onto the drive shaft, and by replacing the usual cover of the tank by cover 21 provided with introduction spout 70.

Surprisingly, the yield of the centrifuge apparatus according to the invention is much higher for soft fruits than the yields obtained with the apparatuses of the prior art.

Tests were carried out with numerous types of fruits. The results are assembled in the table below. Yields varying from 70 to more than 90% are obtained. The apparatuses of the prior art do not generally allow one to exceed 40%, and do not even allow certain fruits, such as black currants, to be processed at all.

| Fruit | Initial weight (kg) | Weight of juice (kg) | Weight of waste (kg) | Yield (%) |
| --- | --- | --- | --- | --- |
| Apricots, without pits | 1.7 | 0.6 | 0.1 | 82 |
| Pineapples, without skin | 1.0 | 0.3 | 0.7 | 73 |
| Bananas, without skins | 0.9 | 0.2 | 0.7 | 86 |
| Strawberries, without stems | 2.00 | 1.85 | 0.15 | 92 |
| Cherries, without pits | 0.69 | 0.59 | 0.10 | 84 |
| Raspberries, without stems | 2.00 | 1.78 | 0.22 | 89 |
| Passion Fruits, without skins | 0.23 | 0.18 | 0.05 | 77 |
| Gooseberries, with thin branches | 0.45 | 0.34 | 0.11 | 74 |
| Mangos, peeled, without pits | 0.50 | 0.38 | 0.12 | 76 |
| Kiwi fruits, without skins | 0.71 | 0.56 | 0.15 | 78 |
| Melons, without skins or seeds | 0.88 | 0.69 | 0.19 | 78 |
| Peaches, with skins, without pits | 1.23 | 1.03 | 0.20 | 84 |

-continued

| Fruit | Initial weight (kg) | Weight of juice (kg) | Weight of waste (kg) | Yield (%) |
|---|---|---|---|---|
| Grapes, with skins and seeds | 1.84 | 1.49 | 0.35 | 80 |
| Plums, with skins, without pits | 1.09 | 0.91 | 0.18 | 83 |
| Tomatoes, with skins and seeds | 2.12 | 2.00 | 0.12 | 94 |

By inspecting the interior of the strainer after the extraction operation, one observes that practically only the seeds, pieces of skin, and fibers remain. This matter is completely trapped in the strainer, and the extracted juice does not contain any of it, even in the case of strawberries, which contain particularly fine seeds. This last effect is surprising because the strainer is perforated with holes approximately one millimeter in diameter, that is to say a diameter larger than the size of the strawberry seeds.

No unbalance is created during the extraction operation because the quantity of residual material in the strainer is very small.

The tests above were carried out at a speed of strainer rotation of 1500 rpm. Other tests showed that the speed of rotation had little influence on the yield of the apparatus. Faster or slower speeds of rotation can be used.

A small quantity of residual material makes it unnecessary to provide a continuous outlet for these materials by overflow into an opening made in the upper part of the tank. It would nevertheless be very easy for the expert in the field to provide one, for example, for processing large quantities of fruits, such as grapes with their skins and seeds.

Furthermore, the invention has been described with regard to a strainer with a vertical axis of symmetry, but a strainer with a horizontal axis of symmetry can be used just as well, with the loading spout in this case also being horizontal.

Finally, it can be stressed that the shape of the blade has little influence on the yield of the apparatus. It does not matter if the blade is more or less wide radially and more or less thick.

It can be radial as described above, or it can be slightly inclined and form an angle of a few degrees with respect to a radial plane.

Likewise, the diameter of the holes of the strainer has little influence.

It should be indicated that it is possible to provide an independent drive component for blade 61, rotating it around axis X-X' in the opposite direction from that of strainer 30. One thus obtains an even higher relative speed of the strainer with respect to the blade, which further increases the pressure on the layer of products formed against radial wall 31.

The drive component can also rotate blade 61 in the same direction as strainer 30, at a much lower speed than that of strainer 30, so that there is a great difference in speed of rotation between strainer 30 and blade 61.

Thus, all apparatuses in which the strainer is given a speed of rotation relative to the blade are included within the scope of the invention, whether the blade is immobile or not.

According to another aspect of the invention, the apparatus has brush 80 for cleaning off the residues found on radial wall 31 after the juice and pulp extraction operation. These residues consist of the fraction of the processed products which could not pass through the radial wall, and essentially includes a small quantity of pulp, the seeds, the skin and/or the fibers of the products, depending on the case. After the extraction operation, once all the products to be processed have been introduced into the tank of the apparatus and have been dilacerated and centrifuged, these residues line an interior side of radial wall 31.

As shown in FIG. 5, brush 80 has support 81 of elongated shape extending parallel to axis X-X' at a distance from radial wall 31 inside of strainer 30, and bristles 82 attached to support 81 and extending radially until they contact radial wall 31.

Support 81 extends essentially over the whole axial height of the radial wall. Bristles 82 are gathered in a number of bunches arranged in a line parallel to axis X-X' and regularly spaced along the support. The spacing between the bunches is chosen so that the bristles are able to clean the entire height of radial wall 31.

The free ends of bristles 82 touch radial wall 31. The material constituting bristles 82 is chosen so that the bristles have a certain stiffness, sufficient to dislodge the small pieces of products wedged in the openings of radial wall 31.

The bristles preferably extend essentially radially, but can also extend according to a direction slightly inclined with respect to the radial direction, in a plane perpendicular to axis X-X', or in a plane containing axis X-X'.

At rest, all the bristles preferably extend in the same direction. At rest is understood to mean the situation in which the strainer is immobile. However, bristles 82 can also extend in several different directions, in order to optimize cleaning as a function of the size and shape of wall 31.

The cleaning procedure includes the following steps.

1/Stopping the apparatus, then manual cleaning of the majority of the residues using a spoon or scraper. One thus eliminates the largest elements which cannot pass through the openings of the radial wall.

2/Positioning the brush inside of strainer 30.

3/Once the brush is in place, strainer 30 is put back in motion to give it a rotational movement relative to brush 80, and a liquid, preferably water, is poured inside of the strainer.

The friction of bristles 82 against radial wall 31 makes it possible to dislodge the residues not collected manually, the rinsing water carrying them through radial wall 31.

If the residues are in small quantity and are made up of small elements capable of passing through the openings, the brush can be used directly without manual cleaning beforehand.

According to a first embodiment variant, corresponding to FIG. 5, brush 80 is mounted in strainer 30 in place of blade 61.

In this case, brush 80 has hub 83 which is mounted on central hub 321 of solid bottom 32 of strainer 30. Shaft 11 and central hub 321 are free to rotate in hub 83. Connecting piece 84, essentially radial, connects an upper part of support 81 and hub 83.

According to a second embodiment variant, not represented, the brush is attached in a removable manner on blade 61, using clips, for example. Bristles 82 of brush 80 then extend radially beyond external edge of blade 61 and come in contact with radial wall 31.

In both cases, brush 80 is rotated when the motor component is started, and stops against spout 70. It is maintained immobile in this position all during the rotation of strainer 30.

It is indeed seen that the apparatus described above is particularly advantageous.

It enables large quantities of soft fruits to be processed easily and quickly, which was impossible up to now.

It is economically advantageous since its yield is high and it allows a larger quantity of juice to be prepared from a given initial weight of products than was prepared by the apparatuses of prior art.

It is simple and inexpensive to manufacture and can be formed using a conventional type of food processor.

Finally, it is very versatile. With one blade, it is suitable for processing soft fruits. The blade can be removed easily, then making the apparatus capable of processing hard products such as apples and carrots.

Brush 80 makes possible extremely effective cleaning of radial wall 31 of strainer 30, and elimination of almost all of the residues trapped in the openings of the strainer.

The invention claimed is:

1. An apparatus for extraction of juice and pulp from plant products, comprising:
   a motor component;
   a tank;
   a cylindrical strainer, symmetrical about an axis, located in the tank, and having a perforated side wall;
   an opening for introduction of the plant products into the strainer, the strainer being rotated around the axis by the motor component so that plant products introduced into the strainer are lacerated and flattened against the perforated side wall; and
   a blade located inside the strainer and separated by a gap from the perforated side wall of the strainer so that the strainer rotates relative to the blade and the blade exerts a force on the lacerated plant products flattened against the side wall and thicker than the gap thereby crushing the lacerated plant products during the extraction of the juice and pulp whereby yield in the extraction of juice from the lacerated plant products is increased.

2. The apparatus according to claim 1, wherein the blade is immobile.

3. The apparatus according to claim 1, wherein the blade extends along all the perforated side wall of the strainer, parallel to the axis.

4. The apparatus according to claim 1, wherein the blade is radial.

5. The apparatus according to claim 1, wherein the tank has a bottom, a lateral discharge opening for discharge of the juice or pulp, and a discharge cone rotated by the motor component, the cone being located between the bottom and the strainer, so that the juice or pulp coming out of the strainer and falling on the cone is moved towards the lateral discharge opening.

6. The apparatus according claim 1, wherein the motor component has a drive shaft driving the strainer and parallel to the axis, the blade is connected to a hub mounted on the shaft, and the shaft is free to rotate with respect to the hub.

7. The apparatus according to claim 1, wherein the tank has an introduction spout opening into the strainer, the blade stopping against the spout when the strainer is rotated by the motor component.

8. The apparatus according to claim 1, including a brush for cleaning residues from the perforated side wall after the extraction, located inside the strainer in contact with the perforated side wall, the strainer moving rotationally relative to the brush.

9. The apparatus according to claim 8, wherein the brush is removably attached to the blade or is mounted in the strainer instead of the blade.

10. The apparatus according to claim 8, wherein the brush includes a support extending parallel to the axis, at a distance from the perforated side wall, and bristles attached to the support extending radially and contacting the perforated side wall.

11. The apparatus according to claim 1 wherein the gap between the perforated side wall and the blade is substantially uniform in width along the perforated side wall.

12. The apparatus according to claim 3 wherein the gap between the perforated side wall and the blade is substantially uniform in width along the perforated side wall.

* * * * *